United States Patent
Shimizu et al.

(10) Patent No.: US 11,456,778 B2
(45) Date of Patent: Sep. 27, 2022

(54) COMMUNICATION CONTROL DEVICE, VEHICLE INCLUDING THE SAME, AND COMMUNICATION CONTROL METHOD

(71) Applicant: KABUSHIKI KAISHA TOKAI RIKA DENKI SEISAKUSHO, Aichi (JP)

(72) Inventors: Norihiro Shimizu, Aichi (JP); Shingo Mochizuki, Aichi (JP); Yosuke Ohashi, Aichi (JP); Keita Sobue, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/362,102

(22) Filed: Jun. 29, 2021

(65) Prior Publication Data

US 2022/0006492 A1 Jan. 6, 2022

(30) Foreign Application Priority Data

Jul. 6, 2020 (JP) .............................. JP2020-116264

(51) Int. Cl.
*H04W 88/10* (2009.01)
*H04B 5/00* (2006.01)
*G06K 7/10* (2006.01)
*H04W 72/04* (2009.01)
*H04W 72/12* (2009.01)

(52) U.S. Cl.
CPC ....... *H04B 5/0031* (2013.01); *G06K 7/10297* (2013.01); *H04W 72/0493* (2013.01); *H04W 72/1215* (2013.01); *H04W 88/10* (2013.01)

(58) Field of Classification Search
CPC ............ H04B 5/0031; H04W 72/0493; H04W 72/1215; H04W 88/10
USPC .................................................. 455/41.1, 41.2
See application file for complete search history.

(56) References Cited

U.S. PATENT DOCUMENTS

| 8,358,596 | B2* | 1/2013 | Byrne | H04W 88/06 370/255 |
|---|---|---|---|---|
| 8,621,126 | B2* | 12/2013 | Sueyoshi | H04B 5/0031 455/41.1 |
| 8,811,897 | B2* | 8/2014 | Matsumoto | G06K 19/0712 455/343.1 |
| 8,878,661 | B2* | 11/2014 | Inaguma | H04M 1/72412 340/438 |
| 9,242,618 | B2* | 1/2016 | Kawai | G07C 5/008 |
| 9,252,845 | B2* | 2/2016 | Geslin | H04W 12/08 |
| 9,673,870 | B2* | 6/2017 | Geslin | H04W 12/08 |
| 11,166,178 | B2* | 11/2021 | Fersman | H04W 24/04 |

(Continued)

FOREIGN PATENT DOCUMENTS

JP 2013-100645 5/2013

*Primary Examiner* — Hai V Nguyen
(74) *Attorney, Agent, or Firm* — Greenblum & Bernstein, P.L.C.

(57) ABSTRACT

NFC standards include a plurality of types (Type A, Type B and Type F). The communication controller performs a polling so as to detect a portable device that communicates in accordance with the NFC standards. The memory stores region information indicating a region where a vehicle is to be used. Based on the region information, the communication controller stops the polling of a type among the plurality of types that is not used in the region.

9 Claims, 5 Drawing Sheets (56) References Cited

U.S. PATENT DOCUMENTS

| | | | | |
|---|---|---|---|---|
| 2010/0190437 | A1* | 7/2010 | Buhot | H04B 5/06 455/41.1 |
| 2011/0022755 | A1* | 1/2011 | Sueyoshi | H04B 5/0031 710/109 |
| 2012/0309302 | A1* | 12/2012 | Buhot | G06K 7/10237 455/41.1 |
| 2013/0116860 | A1* | 5/2013 | Kawai | G07C 9/00309 701/1 |
| 2013/0157565 | A1* | 6/2013 | Clement | H02J 7/025 320/108 |
| 2013/0162421 | A1* | 6/2013 | Inaguma | H04B 5/0031 340/438 |
| 2014/0120961 | A1* | 5/2014 | Buck | G06F 1/329 455/466 |
| 2014/0256252 | A1* | 9/2014 | Geslin | H04B 5/0031 455/41.1 |
| 2014/0342663 | A1* | 11/2014 | Eaton | H04M 1/04 455/41.1 |
| 2015/0181435 | A1* | 6/2015 | Sofer | H04B 5/0031 455/41.1 |
| 2015/0278561 | A1* | 10/2015 | Do Khac | H04B 5/0062 455/41.1 |
| 2015/0358762 | A1* | 12/2015 | Park | H04L 67/535 455/41.1 |
| 2016/0014623 | A1* | 1/2016 | Tanner | H04B 5/0031 455/552.1 |
| 2016/0057565 | A1* | 2/2016 | Gold | H04W 4/023 455/41.1 |
| 2016/0127857 | A1* | 5/2016 | O'Donoghue | H04B 5/0031 455/41.1 |
| 2016/0149616 | A1* | 5/2016 | Geslin | H04W 12/08 455/41.1 |
| 2016/0198287 | A1* | 7/2016 | Hulusi | H04M 11/025 455/41.1 |
| 2017/0127302 | A1* | 5/2017 | Fersman | H04W 84/20 |
| 2017/0257732 | A1* | 9/2017 | Kulkarni | H04B 5/0031 |
| 2018/0225486 | A1* | 8/2018 | Teruyama | G06K 19/07 |

* cited by examiner

<TYPE INFORMATION DB>

| REGION CODE | Type |
|---|---|
| 1 | F |
| 2 | A |
| 3 | A,B |
| ... | ... |

FIG.5

<REGION INFORMATION>

| REGION CODE | 2 |
|---|---|

COMMUNICATION CONTROL DEVICE, VEHICLE INCLUDING THE SAME, AND COMMUNICATION CONTROL METHOD

This non-provisional application is based on Japanese Patent Application No. 2020-116264 filed on Jul. 6, 2020 with the Japan Patent Office, the entire contents of which are hereby incorporated by reference.

BACKGROUND OF THE INVENTION

Field of the Invention

The present disclosure relates to a communication control device, a vehicle including the same, and a communication control method.

Description of the Background Art

There is known a communication system that establishes wireless communication between devices in accordance with the NFC (Near Field Communication) standards. For example, Japanese Patent Laying-Open No. 2013-100645 discloses a communication system that establishes wireless communication between a portable device such as a smartphone or a card and an in-vehicle communication device such as a reader in accordance with the NFC standards so as to allow the portable device to unlock a vehicle door.

In the communication in accordance with the NFC standards, in order to find a device that communicates in accordance with the NFC standards, a reader emits radio waves at fixed intervals (polling), and when a device capable of communicating in accordance with the NFC standards is placed in proximity to the reader, the communication is established between the reader and the device.

The NFC standards include so-called Type A, Type B and Type F. In order to standardize a product (reader) so as to reduce the cost, it is desirable to make the reader support each type. Since each type has the same communication frequency, if the polling of all types is performed by one reader, for example, it is necessary to repeat the polling of three types sequentially so as to prevent the polling of three types from overlapping each other. However, in this case, the transmission interval of radio waves becomes longer in the polling of each type, and thereby, a delay time from a time when the device is placed in proximity to the reader to a time when the device is detected may become greater.

SUMMARY OF THE INVENTION

The present disclosure has been made to solve the aforementioned problems, and an object of the present disclosure is to provide a communication control device that controls communication in accordance with NFC standards, a vehicle including the communication control device, and a communication control method capable of reducing a delay time in detecting a device via polling.

A communication control device of the present disclosure is a communication control device that controls communication in accordance with NFC standards. The NFC standards include a plurality of types (Type A, Type B and Type F). The communication control device includes a control unit and a storage unit. The control unit performs a polling so as to detect a device that communicates in accordance with the NFC standards. The storage unit stores region information indicating a region where a facility equipped with the communication control device is to be used. Based on the region information, the control unit stops the polling of a type among the plurality of types that is not used in the region.

A communication control method of the present disclosure is a communication control method that controls communication in accordance with the NFC standards. The NFC standards include a plurality of types (Type A, Type B and Type F). The communication control method includes a step of performing a polling so as to detect a device that communicates in accordance with the NFC standards, and a step of acquiring region information indicating a region where a facility in which the communication control method is implemented is to be used. The step of performing a polling includes a step of stopping the polling of a type among the plurality of types that is not used in the region based on the regional information.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, embodiments of the present disclosure will be described in detail with reference to the drawings. In the drawings, the same or equivalent portions are denoted by the same reference numerals, and the description thereof will not be repeated.

Figure 1:
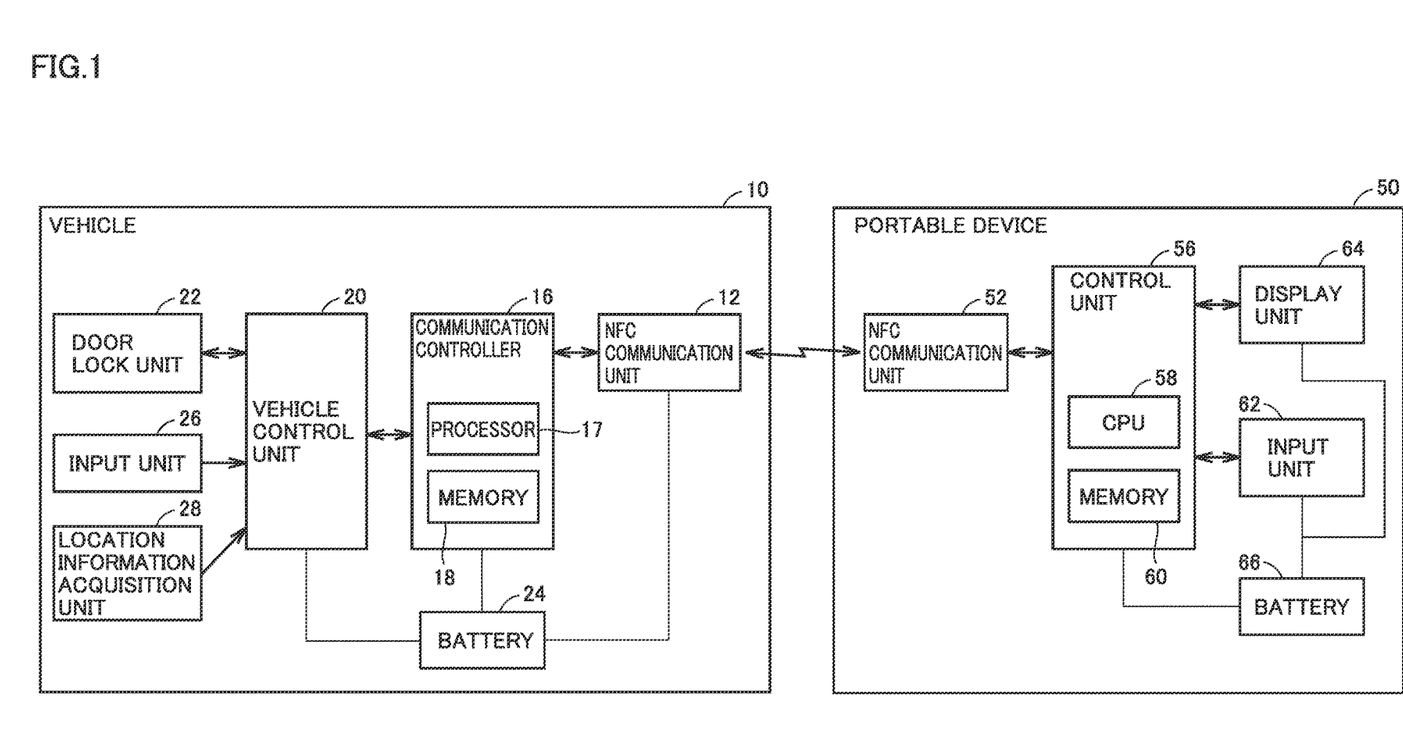
FIG. 1 is a block diagram illustrating an overall configuration of a wireless communication system to which a communication control device according to an embodiment of the present disclosure is applied.

FIG. 1 is a block diagram illustrating an overall configuration of a wireless communication system to which a communication control device according to an embodiment of the present disclosure is applied. With reference to FIG. 1, the wireless communication system includes a vehicle 10 equipped with the communication control device, and a portable device 50. The vehicle 10 includes an NFC communication unit 12, and a communication controller 16 which constitutes the communication control device mentioned above. Although the NFC communication unit 12 and the communication controller 16 are illustrated as separate units in FIG. 1, they may be implemented in the same unit (the same chip or the like).

The NFC communication unit 12 is configured to communicate with the portable device 50 in accordance with NFC standards. The NFC communication unit 12 operates in response to power supplied from a battery 24, and communicates with an NFC communication unit 52 of the portable device 50 through an antenna (not shown) in accordance with the NFC standards (hereinafter, the communication may be referred to as "NFC communication"). The NFC communication unit 12 is provided with at least a reading/writing function among the NFC functions. In addition to the reading/writing function, the NFC communication unit 12 may be provided with an inter-device communication (P2P) function.

Before communicating with the portable device 50, the NFC communication unit 12, in response to an instruction from the communication controller 16, performs a polling so as to detect a device capable of performing NFC communication. In other words, the NFC communication unit 12 transmits a request signal to the surroundings at predetermined intervals in accordance with the NFC standards. When the NFC communication unit 12 receives a response signal which is transmitted from the NFC communication unit 52 of the portable device 50 in response to the request signal, the communication is established between the NFC communication unit 12 and the NFC communication unit 52, and thereby, the NFC communication is performed between the vehicle 10 and the portable device 50.

The NFC standards mainly include three types (Type A, Type B and Type F). Type A and Type B are non-contact IC card standards compliant with International Standards ISO/IEC 14443. Type F is a proximity IC card standard compliant with JIS X 6319-4. In the present embodiment, the NFC communication unit 12 is configured to support each of Type A, Type B and Type F. The communication controller 16 determines which type will be used to perform polling and NFC communication.

The communication controller 16 includes a processor 17 and a memory 18. The processor 17 is an arithmetic processing unit such as a central processing unit (CPU), a microcontroller or a microcomputer. The memory 18 is a storage unit such as a RAM (Random Access Memory) or a ROM (Read Only Memory). The processor 17 reads out a program stored in the ROM of the memory 18 and executes the program so as to control the NFC communication unit 12. The details of the control will be described later.

The memory 18 stores various programs to be executed by the processor 17 and various data to be used by the processor 17. Although the details will be described later, in the present embodiment, the memory 18 stores type information indicating a type (Type A, Type B and/or Type F) of the NFC standards that may be used in each country or each region, and region information indicating a country or a region where the vehicle 10 is to be used.

The vehicle 10 further includes a vehicle control unit 20, a door lock unit 22, a battery 24, an input unit 26, and a location information acquisition unit 28. The door lock unit 22 is configured to switch a boarding door of the vehicle 10 between a locked state and an unlocked state.

The vehicle control unit 20 includes a CPU, a memory, a signal input/output port, and the like (none of which is shown in the figures). The vehicle control unit 20 performs various controls of the vehicle 10 except the controls performed by the communication controller 16. As an example, when the vehicle control unit 20 receives from the communication controller 16 a notification indicating that the portable device 50 detected via polling has been authenticated (which will be described later), the vehicle control unit 20 permits operations (door locking/unlocking operations) of the door lock unit 22. Specifically, the vehicle control unit 20 outputs a locking command to the door lock unit 22 in response to a request of locking the boarding door, and outputs an unlocking command to the door lock unit 22 in response to a request of unlocking the boarding door.

The battery 24 is used by auxiliary components of the vehicle 10, and may be, for example, a lead battery. The battery 24 supplies operating power to the NFC communication unit 12, the communication controller 16, and the vehicle control unit 20.

The input unit 26 may be operated by a user or a dealer of the vehicle 10, and may be, for example, a car navigation device (not shown) having an input function. The input unit 26 may be used to input various settings. In the present embodiment, the input unit 26 may be used to input information (in particular, information of a region where the vehicle 10 is to be used), which will be stored in the memory 18 of the communication controller 16.

The location information acquisition unit 28 acquires location information indicating a current location of the vehicle 10. For example, the location information acquisition unit 28 may be a GPS receiver configured to determine the current location of the vehicle 10 based on a radio signal received from a GPS (Global Positioning System) satellite, or may be a receiver configured to acquire information of the current location of the vehicle 10 from a nearby vehicle via vehicle-to-vehicle communication or from a roadside unit via road-to-vehicle communication.

The portable device 50 includes an NFC communication unit 52, a control unit 56, an input unit 62, a display unit 64, and a battery 66.

The NFC communication unit 52 is configured to communicate with the vehicle 10 in accordance with the NFC standards. The NFC communication unit 52 performs NFC communication with the NFC communication unit 12 of the vehicle 10 through an antenna (not shown). The NFC communication unit 52 includes a passive tag (IC tag) that can be actuated by radio waves from the NFC communication unit 12. In other words, the NFC communication unit 52 can be actuated by radio waves received from the NFC communication unit 12 without the need of receiving power from the battery 66. Accordingly, the NFC communication unit 52 can communicate with the NFC communication unit 12 of the vehicle 10 even when the portable device 50 is powered off.

Upon receiving the request signal transmitted from the NFC communication unit 12, the NFC communication unit 52 generates a response signal including ID information which is unique to the portable device 50 and written in the passive tag (IC tag), modulates the response signal, and transmits the modulated response signal to the NFC communication unit 12 of the vehicle 10.

The control unit 56 includes a CPU 58, a memory 60, signal input/output ports (not shown), and the like. The control unit 56 performs various controls of the portable device 50. The input unit 62 accepts various inputs made by the user on the portable device 50, and may be, for example, a touch sensor that detects touch operations on a display unit 64, or various operation buttons provided on the portable device 50. The display unit 64 displays various kinds of information of the portable device 50, information corresponding to the inputs from the input unit 62, and the like. The input unit 62 and the display unit 64 may be integrally formed into a touch panel sensor.

The battery 66 may be a rechargeable secondary battery such as a lithium-ion secondary battery. The battery 66 may be charged by an external power source using a charging device (not shown). The battery 66 supplies operating power to the control unit 56, the input unit 62, and the display unit 64. As described above, since the NFC communication unit 52 includes a passive tag that can be actuated by radio waves from the NFC communication unit 12, the NFC communication unit 52 does not receive power from the battery 66.

As described above, the NFC standards include three types of Type A. Type B and Type F. In the present embodiment, the NFC communication unit 12 and the communication controller 16 of the vehicle 10 are configured in such a manner that the vehicle 10 may communicate with the portable device 50 regardless of which type of the three NFC standards mentioned above is supported by the portable device 50.

Since each of the three types mentioned above has the same communication frequency (13.56 MHz), if the NFC communication unit 12 is used to perform the polling of all types, it is necessary to repeat the polling of three types sequentially so as to prevent the polling of three types from overlapping each other. However, in this case, the transmission interval of radio waves becomes longer in the polling of each type, and thereby, a time delay from a time when the portable device 50 is placed in proximity to the NFC communication unit 12 to a time when the portable device 50 is detected become greater.

Figure 2:
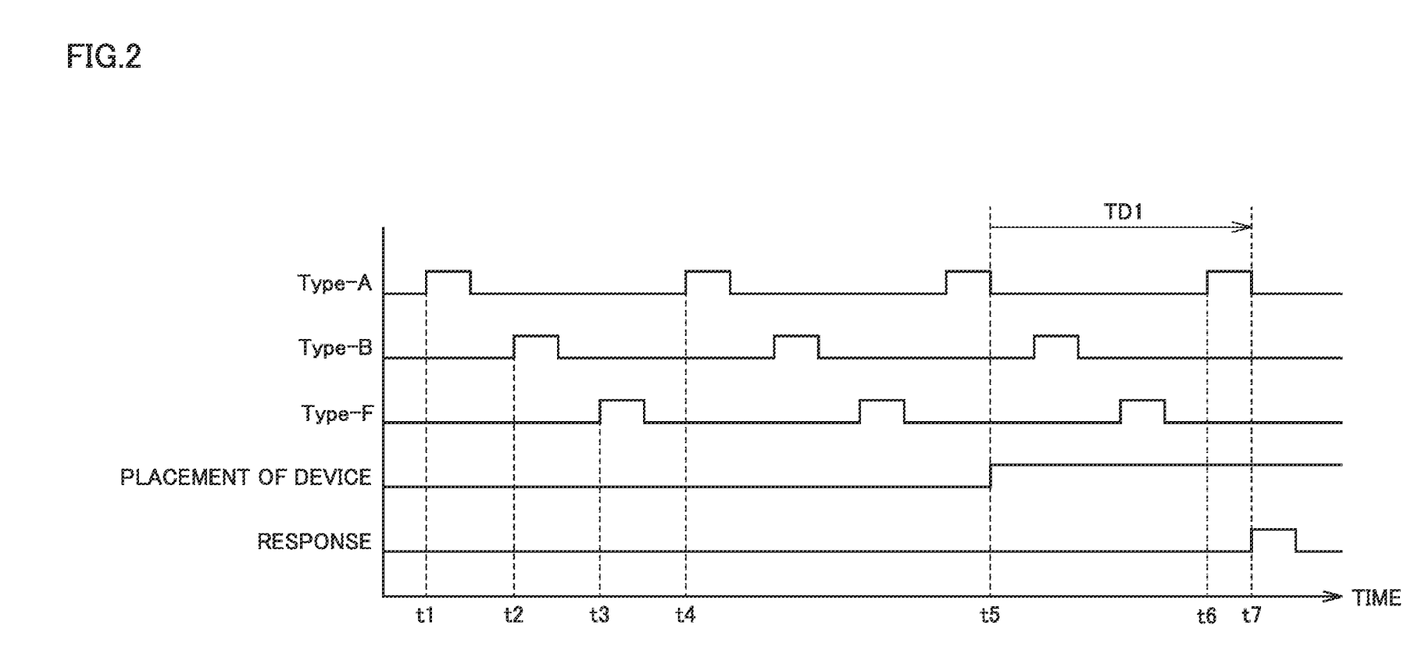
FIG. 2 is a timing chart when the polling of all types is performed by one reader according to a reference example.

FIG. 2 is a timing chart when the polling of all types is performed by one reader according to a reference example. With reference to FIG. 2, in this example, in order to perform the polling of each of Type A. Type B and Type F, the polling of each type is repeated sequentially without overlapping each other. Specifically, the polling of Type A is performed in a fixed period starting from time t1, the polling of Type B is performed in a fixed period starting from time t2, the polling of Type F is performed in a fixed period starting from time t3, and thereafter, the polling of Type A is repeated in a fixed period starting from time t4.

Suppose that at time t5, a device supporting Type A is placed in proximity to the reader. In this case, the reader detects the device based on a response from the device at time t7 corresponding to the polling of Type A starting from time t6. In this example, since the time (time t5) at which the device is placed in proximity to the reader is immediately after the polling of Type A, the delay time TD1 from time t5 when the device is placed in proximity to the reader to time t7 when the device is detected becomes greater.

Thus, when the polling of all types is performed, the transmission interval of radio waves becomes longer in the polling of each type (for example, time t1 to time t4 in FIG. 2), and thereby, the delay time from a time when the portable device 50 is placed in proximity to the NFC communication unit 12 to a time when the portable device 50 is detected becomes greater.

Therefore, in the wireless communication system according to the present embodiment, if it is determined, based on information of a region where the vehicle 10 equipped with the NFC communication unit 12 and the communication controller 16 is to be used, that a type is not used in the region, the polling of that type is not performed. The fact that which type among Type A, Type B and Type F is used in a country or a region where the vehicle 10 is to be used depends on different countries or regions. Generally, Type F is widely used in Japan or several countries of Asia, and Type A and/or Type B are widely used in the other countries or regions. According to the present embodiment, the polling of a type that is not used in a region (a country or a region including a group of countries) where the vehicle 10 is to be used is not performed, which makes it possible to reduce a delay time in detecting the portable device 50 via polling.

Figure 3:
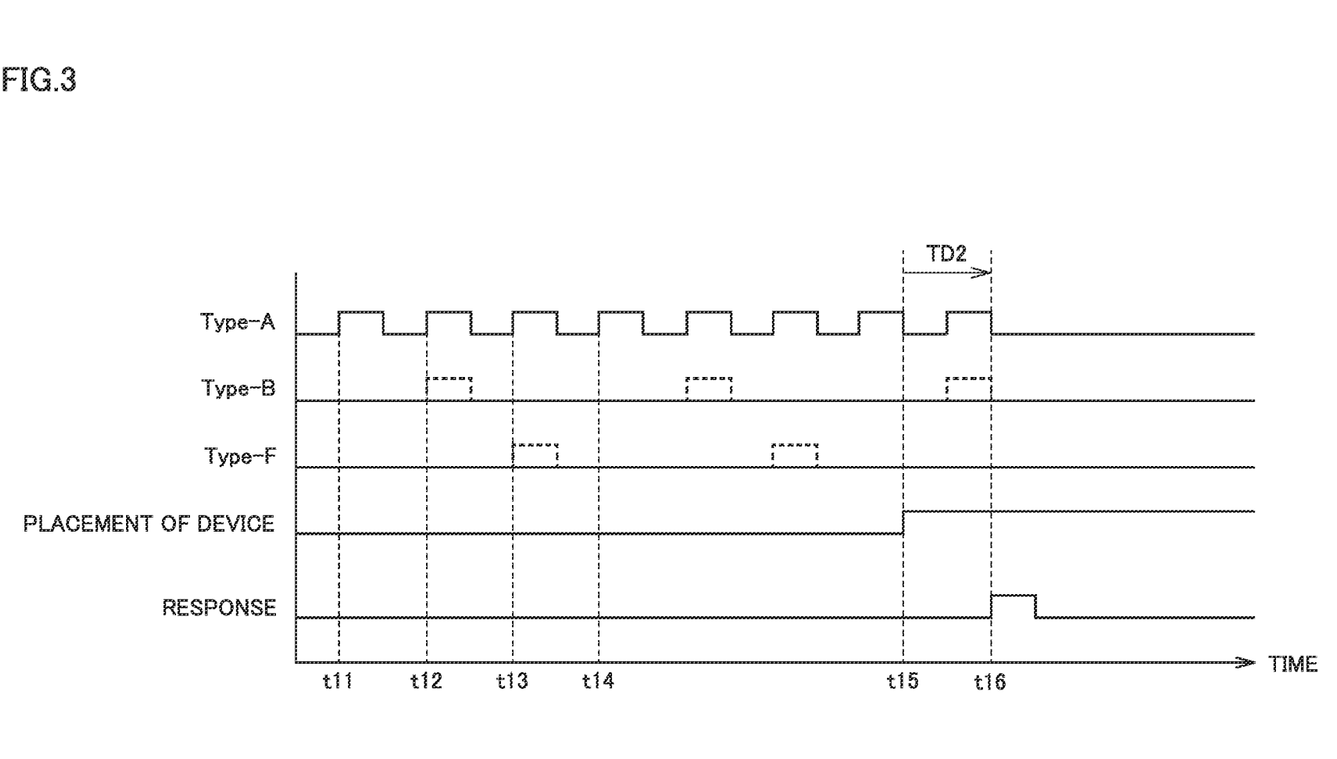
FIG. 3 is a timing chart illustrating an example polling according to the present embodiment.

FIG. 3 is a timing chart illustrating an example polling according to the present embodiment. With reference to FIG. 3, in the present embodiment, it is supposed that only Type A of the NFC standards is widely used in a region where vehicle 10 is to be used, while Type B and Type F are not used in the region. Therefore, the polling of Type B and Type F is not performed, and only the polling of Type A is performed. Therefore, the polling interval of Type A (for example, time t11 to time t12) is shorter than the polling interval of Type A (time t1 to time t4) in FIG. 2.

Suppose that at time t5, the portable device 50 supporting Type A is placed in proximity to the NFC communication unit 12. In this case, the NFC communication unit 12 detects the portable device 50 based on a response from the portable device 50 at time t16 corresponding to the next polling. As described above, since the polling interval of Type A is shorter than that of the reference example illustrated in FIG. 2, the delay time TD2 from time t15 when the portable device 50 is placed in proximity to the NFC communication unit 12 to time t16 when the portable device 50 is detected is shorter than the delay time TD1 illustrated in FIG. 2.

As described above, in the present embodiment, the polling of Type A is performed, while the polling of Type B and Type F is not performed. The type to be polled or not to be polled is determined based on the type information and the region information stored in the memory 18 of the communication controller 16. The type information indicates types of the NFC standards (Type A, Type B and/or Type F) that may be used in each country or region. The region information indicates a country or a region where the vehicle 10 equipped with the NFC communication unit 12 and the communication controller 16 for NFC communication is to be used.

Figure 4:
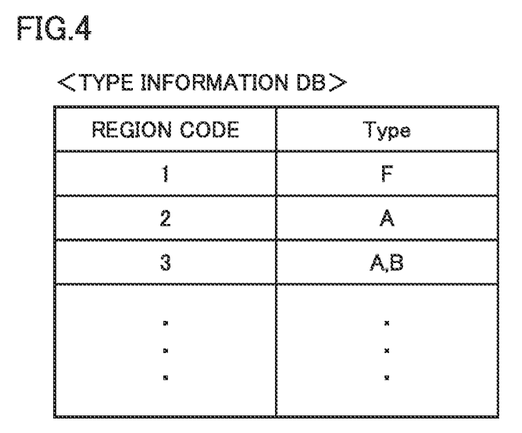
FIG. 4 is a diagram illustrating an example data structure of a type information database stored in a memory of a communication controller.

FIG. 4 is a diagram illustrating an example data structure of a type information database (DB) stored in the memory 18 of the communication controller 16. With reference to FIG. 4, a region code is assigned to each country or region. The region code may be assigned in country unit or in region unit (for example, Europe) which includes a group of countries. In this example, the region code is a number, but the region code may be, for example, a string of alphabetic letters.

The column of "Type" contains data corresponding to each region code, and indicates the type of NFC standards usable in a country or a region indicated by a corresponding region code. In this example, Type F of the NFC standards is widely used in a country or a region assigned with a region code of "1", and thus, Type F is set as a usable type. In other words, in a country or a region assigned with a region code of "1". Type A and Type B are non-usable types. In a country or a region assigned with a region code of "3", Type A and Type B of the NFC standards are widely used, and thus, Type A and Type B are set as usable types. In other words, in a country or a region assigned with a region code of "3", Type F is a non-usable type.

The type information DB may be written in the memory 18 at the manufacturing of the communication controller 16, may be read from an external device (such as a USB memory or an input terminal) (not shown), or may be received from an external server by using a wireless device (not shown).

Figure 5:
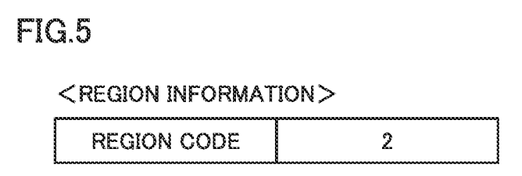
FIG. 5 is a diagram illustrating an example data structure of region information stored in a memory of a communication controller.

FIG. 5 is a diagram illustrating an example data structure of region information stored in the memory 18 of the communication controller 16. With reference to FIG. 5, the region information includes a region code corresponding to a region where the vehicle 10 equipped with the NFC communication unit 12 and the communication controller 16 for NFC communication is to be used. In this example, the region code is assigned with a number of "2". This region information is compared with the type information DB illustrated in FIG. 4 so as to determine a type to be used for NFC communication. In this example, based on the region information, Type A is determined as a usable type, and Type B and Type F are determined as non-usable types.

The region information, for example, may be initialized at the manufacturing or shipment of the vehicle 10 based on a destination region where the vehicle 10 is to be used. In addition, since the country or region where the vehicle 10 is to be used may be changed later, in the present embodiment, the user or the dealer of the vehicle 10 may set or modify (update) the region information via the input unit 26 (FIG. 1). Furthermore, the region information may be set or modified (automatically updated) based on the location information of the vehicle 10 acquired by the location information acquisition unit 28 (FIG. 1).

Figure 6:
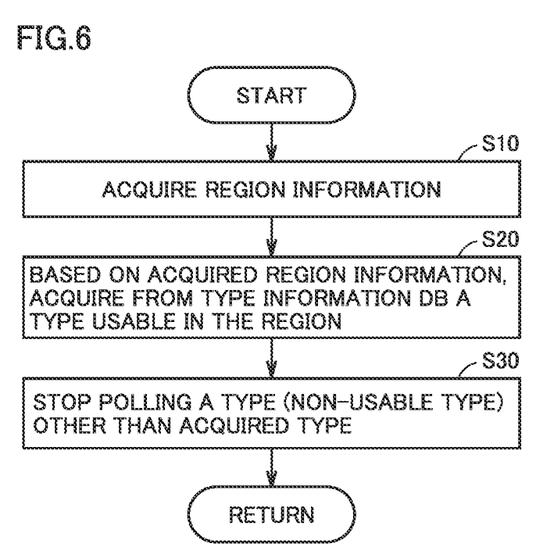
FIG. 6 is a flowchart illustrating an example process of stopping the polling of a type performed by a communication controller.

FIG. 6 is a flowchart illustrating an example process of stopping the polling of a type to be performed by the communication controller 16. With reference to FIG. 6, the communication controller 16 acquires, from memory 18, region information indicating a region code corresponding to a region where vehicle 10 is to be used (step S10). The region information, for example, is initialized based on the destination region of the vehicle 10 at the manufacturing or shipment of the vehicle 10 and is stored in the memory 18.

Next, the communication controller 16, based on the acquired region information, acquires from the type information DB of the memory 18 a type that may be used in the region indicated by the region information among the Type A, the Type B and the Type F of the NFC standards (step S20).

Then, the communication controller 16 stops polling any type other than the type acquired in step S20 (step S30). In other words, the communication controller 16 stops polling any non-usable type in the region indicated by the region information acquired in step S10. Thus, as described with reference to the timing chart of FIG. 3, it is possible to reduce the delay time in detecting the portable device 50 via polling.

The polling of a type that is not stopped in step S30 is constantly executed even when the vehicle 10 is not running, except during the maintenance of the NFC communication unit 12 or the communication controller 16.

As described above, in the present embodiment, the user or the dealer of the vehicle 10 may set or modify (update) the region information from the input unit 26 (FIG. 1).

Figure 7:
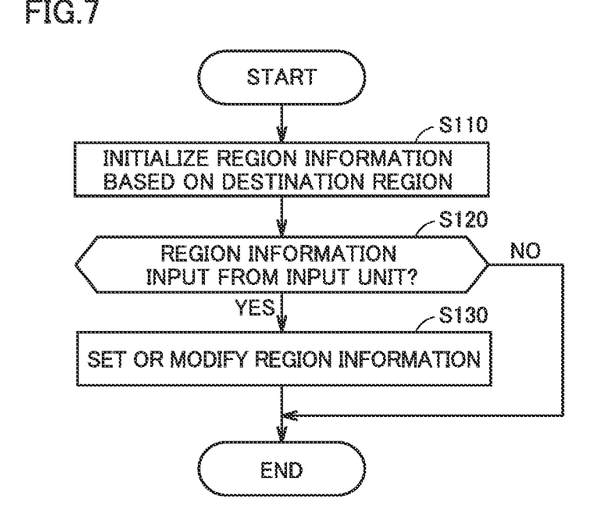
FIG. 7 is a flowchart illustrating an example process of configuring region information.

FIG. 7 is a flowchart illustrating an example process of configuring region information. The configured region information is stored in the memory 18 of the communication controller 16, and is acquired from the memory 18 in step S10 of FIG. 6.

With reference to FIG. 7, information of a region where vehicle 10 is to be used is initialized based on the destination region of the vehicle 10, and is stored in memory 18 as region information (step S110). The destination region of the vehicle 10 may be set, for example, at the manufacturing or shipment of the vehicle 10.

Next, the communication controller 16 determines whether or not region information is input from the input unit 26 (FIG. 1) (step S120). The input from the input unit 26 is sent to the communication controller 16 through the vehicle control unit 20. The region information may be input by, for example, the user or the dealer of the vehicle 10 from the input unit 26.

If it is determined that the region information is input from the input unit 26 (YES in step S120), the communication controller 16 modifies (updates) the region information stored in the memory 18 based on the region information input from the input unit 26 (step S130). If it is determined that no region information is input from the input unit 26 (NO in step S120), step S130 is not executed, and the region information in the memory 18 remains unchanged.

Although not particularly illustrated in the figures, after the region information is modified based on the input from the input unit 26, if the region information is input again from the input unit 26, the region information stored in the memory 18 may be modified (updated) based on the newly input region information.

In the present embodiment, since the location information acquisition unit 28 (FIG. 1) is provided, the region information stored in the memory 18 may be set or modified (automatically updated) based on the location information of the vehicle 10 acquired by the location information acquisition unit 28.

Figure 8:
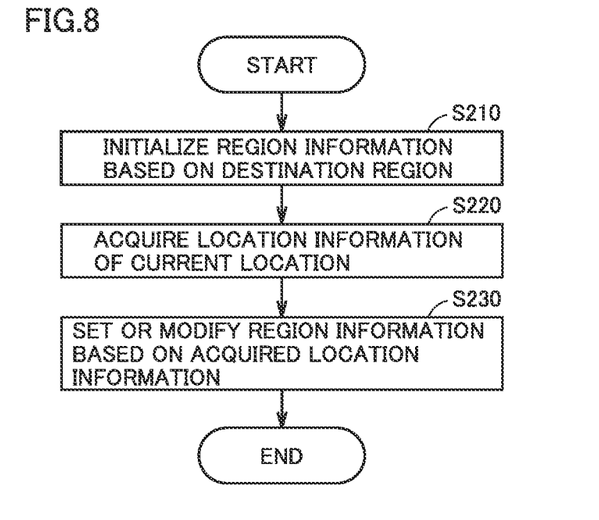
FIG. 8 is a flowchart illustrating another example process of configuring region information.

FIG. 8 is a flowchart illustrating another example process of configuring region information. In this example, the configured region information is also stored in the memory 18 of the communication controller 16, and is acquired from the memory 18 in step S10 of FIG. 6.

With reference to FIG. 8, also in this example, the information of a region where vehicle 10 is to be used is initialized based on the destination region of vehicle 10, and is stored in memory 18 as region information (step S210).

Next, the location information acquisition unit 28 acquires the location information of the vehicle 10, and the communication controller 16 receives the acquired location information from the location information acquisition unit 28 (step S220). The location information indicates the current location of the vehicle 10. The acquired location information is sent to the communication controller 16 through the vehicle control apparatus 20. The location information acquisition unit 28 may acquire the location information of the vehicle 10 by using a GPS receiver, or may acquire the location information of the vehicle 10 from a nearby vehicle via vehicle-to-vehicle communication or from a roadside unit via road-to-vehicle communication.

Then, the communication controller 16, based on the location information of the vehicle 10 acquired by the location information acquisition unit 28, modifies (updates) the data of the region information stored in the memory 18 (step S230). A table or the like that associates the location information acquired by the location information acquisition unit 28 with a corresponding region code is provided. The communication controller 16 uses the table to convert the location information of the vehicle 10 acquired by the location information acquisition unit 28 into a region code, and updates the regional information stored in the memory 18.

As described above, in the present embodiment, the polling of a non-usable type in the region is stopped based on the information of the region where the vehicle 10 equipped with the NFC communication unit 12 and the communication controller 16 for NFC communication is to be used. Thus, according to the present embodiment, it is possible to reduce the delay time in detecting the portable device 50 via polling.

In the embodiment mentioned above, it is described that the portable device 50 equipped with the NFC communication unit 52 is a device that includes the control unit 56, the battery 66, and the like (such as a smartphone), and it is acceptable that the portable device 50 is a card without the control unit 56, the battery 66, and the like.

In the embodiment mentioned above, it is described that the communication controller 16 is provided separately from the vehicle control unit 20 in the vehicle 10, and it is acceptable that the communication controller 16 is integrated with the vehicle control unit 20.

In the embodiment mentioned above, it is described that the NFC communication unit 12 and the communication controller 16 are mounted on the vehicle 10, but the present disclosure is not limited to a communication control device mounted on the vehicle. For example, the NFC communication unit 12 and the communication controller 16 may be provided in a residential room or a home delivery box, and the portable device 50 may be used as a key to lock or unlock a door of the residential room or the home delivery box.

It should be understood that the embodiments disclosed herein are illustrative and not restrictive in all respects. The technical scope indicated by the present disclosure is defined by the appended claims rather than by the description of the embodiments described above, and is intended to include all modifications within the meaning and range equivalent to the appended claims.

The embodiments described above are specific examples of the following aspects.

A communication control device according to one aspect of the present disclosure is a communication control device that controls communication in accordance with NFC standards. The NFC standards include a plurality of types (Type A, Type B and Type F). The communication control device includes a control unit and a storage unit. The control unit performs a polling so as to detect a device that communicates in accordance with the NFC standards. The storage unit stores region information indicating a region where a facility equipped with the communication control device is to be used. Based on the region information, the control unit stops the polling of a type among the plurality of types that is not used in the region.

A communication control method according to one aspect of the present disclosure is a communication control method that controls communication in accordance with the NFC standards. The NFC standards include a plurality of types (Type A, Type B and Type F). The communication control method includes a step of performing a polling so as to detect a device that communicates in accordance with the NFC standards, and a step of acquiring region information indicating a region where a facility in which the communication control method is implemented is to be used. The step of performing a polling includes a step of stopping the polling of a type among the plurality of types that is not used in the region based on the regional information.

In the communication control device and the communication control method described above, based on information of the region in which a facility equipped with the communication control device or a facility in which the communication control method is implemented is to be used, the polling of a type among a plurality of types that is not used in a region is stopped. Therefore, according to the communication control device and the communication control method, it is possible to reduce the delay time in detecting a device via polling.

The region information may be initialized based on the region information of a destination region where the facility is to be used. As a result, it is possible to automatically stop the polling of a type that is not used in the destination region without the need for the user or the dealer to input the region information.

The control unit may set the region information based on input information input by the user from an input unit. Thus, even when the country or region where the facility is to be used is changed later, it is possible to stop the polling of a type that is not used in the region.

The control unit may acquire the location information indicating the current location of the facility, and set the region information based on the acquired location information. Thus, it is possible to automatically stop the polling of a type that is not used at the location of the facility.

What is claimed is:

1. A communication control device that controls communication in accordance with NFC standards, the NFC standards include a plurality of types, the communication control device comprising:
    a control unit that performs a polling so as to detect a device that communicates in accordance with the NFC standards; and
    a storage unit that stores region information indicating a region where a facility equipped with the communication control device is to be used,
    based on the region information, the control unit stopping the polling of a type among the plurality of types that is not used in the region.

2. The communication control device according to claim 1, wherein
    the region information is initialized based on a destination region where the facility is to be used.

3. The communication control device according to claim 1, wherein
    the control unit sets the region information based on input information input by a user from an input unit.

4. The communication control device according to claim 1, wherein
    the control unit acquires location information indicating a current location of the facility, and sets the region information based on the acquired location information.

5. A vehicle comprising:
    a communication unit that communicates in accordance with NFC standards; and
    a communication control device according to claim 1.

6. A communication control method that controls communication in accordance with NFC standards, the NFC standards include a plurality of types, the communication control method comprising:
    performing a polling so as to detect a device that communicates in accordance with the NFC standards; and
    acquiring region information indicating a region where a facility in which the communication control method is implemented is to be used,
    the performing a polling including stopping the polling of a type among the plurality of types that is not used in the region based on the region information.

7. The communication control method according to claim 6, wherein
    the region information is initialized based on a destination region where the facility is to be used.

8. The communication control method according to claim 6, wherein
    the method further includes setting the region information based on input information input by a user from an input unit.

9. The communication control method according to claim 6, wherein the method further includes
    acquiring location information indicating a current location of the facility, and setting the region information based on the acquired location information.

* * * * *